UNITED STATES PATENT OFFICE.

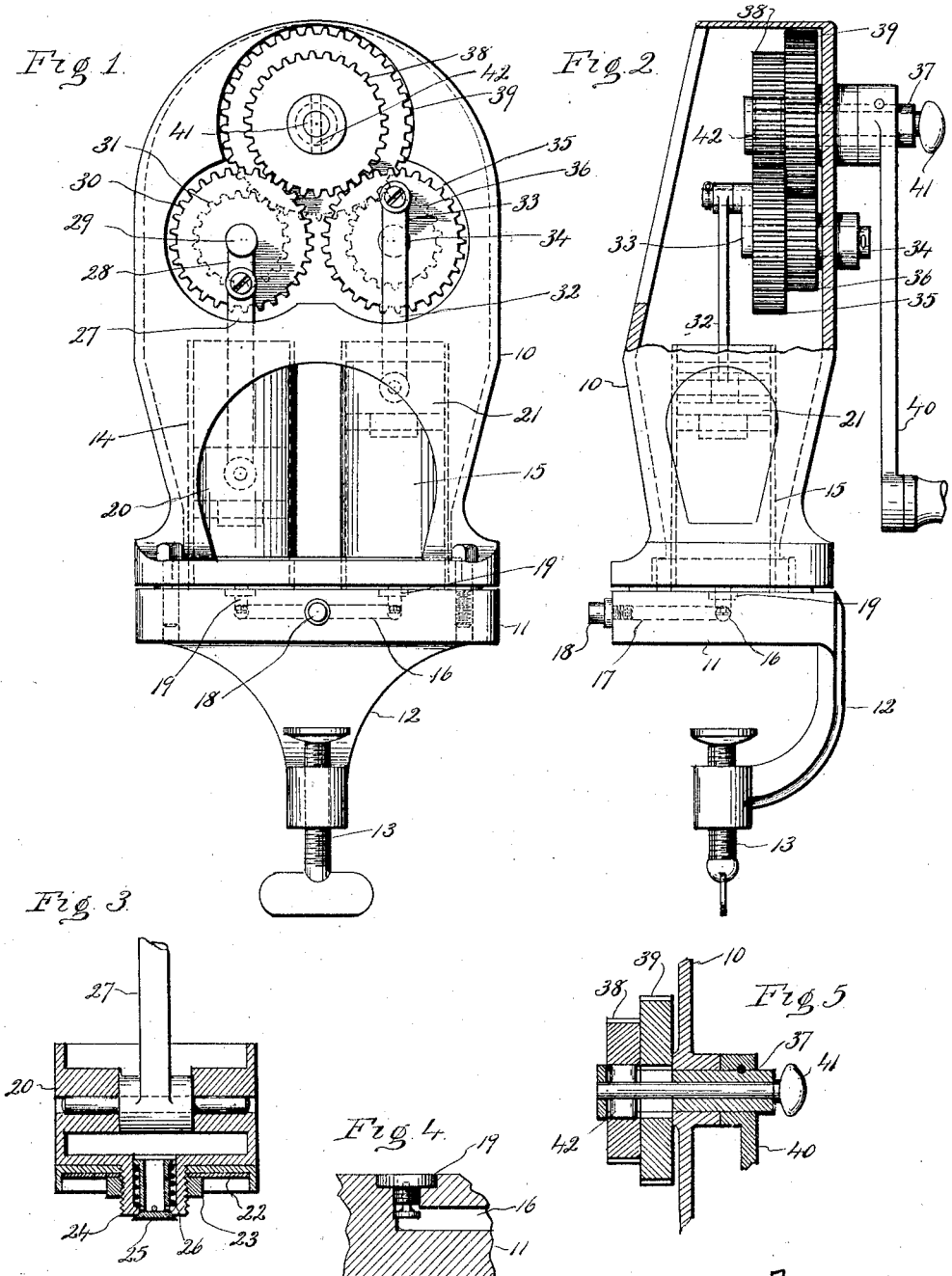

JEREMIAH F. HENRY, OF ANSONIA, CONNECTICUT.

AIR-PUMP.

1,332,041.

Specification of Letters Patent. Patented Feb. 24, 1920.

Application filed June 27, 1919. Serial No. 307,223.

*To all whom it may concern:*

Be it known that I, JEREMIAH F. HENRY, a citizen of the United States, residing at Ansonia, in the county of New Haven and State of Connecticut, have invented a new and useful Improvement in Air-Pumps; and I do hereby declare the following, when taken in connection with the accompanying drawings and the characters of reference marked thereon, to be a full, clear, and exact description of the same, and which said drawings constitute part of this application, and represent, in—

Figure 1 a face view of an air pump constructed in accordance with my invention.

Fig. 2 a side view of the same, partly broken away.

Fig. 3 a sectional view of one of the pistons.

Fig. 4 a broken sectional view showing the outlet from one of the cylinders.

Fig. 5 a broken sectional view of the driving gears, driving shaft, and means for connecting the driving gears with the driving shaft.

This invention relates to an improvement in air pumps particularly adapted for attachment to the running boards of automobiles for use in connection with inflating tires, the object being a simple arrangement of parts whereby the tires may be fully inflated with a minimum degree of expenditure of force; and the invention consists in the construction hereinafter described and particularly recited in the claim.

In carrying out my invention, I employ a casing 10 secured to or mounted upon a base 11 formed with a clamping arm 12 carrying a clamping screw 13 by which the device may be clamped to the running-board of an automobile or other convenient point. Within the casing are two cylinders 14 and 15 which open at the bottom into a transverse passage 16 in the base which opens into a centrally arranged port 17 provided at its outer end with a nipple 18 to which a pump tube may be attached in the usual manner. Between the cylinders and the passage 16 are check valves 19. In the cylinder 14 is a piston 20 and in the cylinder 15 is a piston 21. Connected with the bottom of each piston is a cup-shaped leather packing 22 secured in place by a nut 23, and an externally threaded tubular stem 24 which contains a valve 25 normally held in the closed position by a spring 26. The piston 20 is connected by a piston rod 27 with a crank arm 28 on a shaft 29 mounted in the casing, and keyed to this shaft 29 are differential gears 30 and 31. The piston 21 is connected by a piston rod 32 with a crank arm 33 on a shaft 34 which is mounted in the casing parallel with the shaft 29, and on this shaft are keyed differential gears 35 and 36. Mounted in the casing above the shafts 29 and 34 and centrally in line between them, is a shaft 37 on which are loosely mounted a gear 38 meshing with the gears 30 and 35, and also a larger gear 39 meshing with the gears 31 and 36. Connected with the shaft 37 is a crank handle 40 by which the shaft may be turned, and extending through the shaft 37 is a pin 41 carrying a key 42 which may be engaged with either of the gears 38 or 39 and so that the turning of the shaft 37 will move one or the other of the said gears. If the key 42 is engaged with the gear 38, this gear will turn the large gears 30 and 35 and thus rapidly move the piston rods 27 and 32 so as to move the pistons 14 and 21 in their cylinders, it being noted that the crank arms 28 and 33 extend in opposite directions so that when one piston is moved down, the other piston will be moved up, the downward movement of the piston discharging air through the nipple 18 and the pump tube, not shown. When more power is required, as in completing the pumping operation, the key 42 will be moved outward so as to engage with the gear 39 which is a larger gear, and meshing with the smaller gears 31 and 36, will give increased power to the movement of the pistons.

I claim:—

An air pump comprising a casing, two cylinders mounted side by side therein and connected with a single outlet, a piston in each cylinder, a piston rod connected with each piston, a crank connected with each of said piston rods, differential crank gears connected with each of said cranks, a driving shaft, a crank on said driving shaft, differential gears on said driving shaft and meshing with said crank gears, a pin extending through the driving shaft, and a key carried by said pin and adapted to couple either of the driving gears with the driving shaft.

In testimony whereof, I have signed this specification in the presence of two subscribing witnesses.

JEREMIAH F. HENRY.

Witnesses:
CHARLES J. O'CONNELL,
WILLIAM H. MORGAN.